United States Patent
Suwelack et al.

(12)

(10) Patent No.: US 6,428,833 B1
(45) Date of Patent: Aug. 6, 2002

(54) PROCESS FOR FREEZE DRYING COFFEE EXTRACT

(75) Inventors: Wolfgang Suwelack; Dorothee Kunke, both of Billerbeck (DE)

(73) Assignee: Dr. Otto Suwelack Nachf.GmbH & Co., Billerbeck (DE)

( * ) Notice: Subject to any disclaimer, the term of this patent is extended or adjusted under 35 U.S.C. 154(b) by 0 days.

(21) Appl. No.: 08/945,788

(22) PCT Filed: May 13, 1996

(86) PCT No.: PCT/EP96/02030

§ 371 (c)(1),
(2), (4) Date: Sep. 28, 1998

(87) PCT Pub. No.: WO96/36241

PCT Pub. Date: Nov. 21, 1996

(30) Foreign Application Priority Data

May 16, 1995 (DE) .......................................... 195 19 129
Mar. 4, 1996 (DE) .......................................... 196 09 377

(51) Int. Cl.⁷ .............................. A23F 5/00; A23F 5/30; A23C 1/06
(52) U.S. Cl. ....................... 426/385; 426/594; 426/444; 426/522; 426/524
(58) Field of Search ................................ 426/594, 444, 426/522, 524, 385

(56) References Cited

U.S. PATENT DOCUMENTS

| 2,751,687 A | 6/1956 | Colton |
| 3,408,919 A | 11/1968 | Guggenheim |
| 3,482,990 A | 12/1969 | Pfluger et al. |
| 3,573,060 A | 3/1971 | Casten et al. |
| 3,635,727 A | 1/1972 | Ehrgott |
| 4,138,502 A | 2/1979 | Ehrgott et al. |
| 4,279,579 A | 7/1981 | Froeschke |
| 4,324,808 A * | 4/1982 | Wertheim et al. |
| 4,565,706 A * | 1/1986 | Wertheim et al. |
| 4,929,456 A | 5/1990 | Behjarano-Wallens et al. |
| 5,013,498 A | 5/1991 | Froeschke |

FOREIGN PATENT DOCUMENTS

| DE | 1 906 924 | 9/1969 |
| DE | 2 038 083 | 2/1971 |
| DE | 1 692 269 | 1/1972 |
| DE | 1 778 216 | 1/1972 |
| DE | 2 150 037 | 4/1972 |

OTHER PUBLICATIONS

Thijssen et al, "Effect of Freezing Rate on Rate of Sublimation and Flavour Retention in Freeze–Drying", pp. 99–113.

Flink, James, "The retention of volatile components during freeze drying" a structurally based mechanism, Chapter 22, FD and Adv. Food Tech. pp. 351–370 (1975).

Willemer, Hanna M., "Reproducible Freeze–Drying Processes As Part of The Quality System", PDA Asian Symposium, pp. 295–304, Nov. 14–16, 1994, Tokyo, Japan.

"Sandvik Rotoform Process, Premium Pastilles: The recipe for success in the food industry", Sandvik Process Systems.

* cited by examiner

Primary Examiner—Anthony J. Weier
(74) Attorney, Agent, or Firm—Nixon & Vanderhye P.C.

(57) ABSTRACT

A process for freeze drying coffee extract in the form of pellets combines short freeing times with high drying pressures, saving time and energy in comparison with conventional processes. The thus obtained product has an excellent flavour and its surface reminds one of freshly roasted coffee beans.

8 Claims, No Drawings

PROCESS FOR FREEZE DRYING COFFEE EXTRACT

This application is a 371 of PCT/EP96/02030 filed May. 13, 1996.

The invention relates to a process for freeze-drying coffee extract which saves energy and time in comparison with the processes known up to now. The invention furthermore relates to the thus obtainable freeze-dried coffee extract in pellet form.

Freeze-dried coffee extract for use as "instant coffee" is usually produced as granules, whereby aqueous coffee extract with a dry substance content of approximately 40 wt/vol. % is foamed to a foam weight of approximately 450 to 750 g/l, the composition is cooled for approximately 30 minutes on freezing belts to a foam temperature of approximately −45° C. and the frozen product is ground at −40 to −50° C. The thus obtained granules are screened at low temperatures in order to eliminate the fines with grain sizes of less than 0.5 mm and particles with grain sizes above 3 mm. The quantity of fines, i.e. of particles with grain sizes below 0.5 mm, usually accounts for 30 to 35 wt. % of the frozen total product. After screening, approximately 95% of the granules have grain sizes in the range from 0.5 to 3 mm, but often up to 5% of fines with grain sizes of 0.5 mm or less are still present. The proportion of particles between 0.5 mm and 1 mm is approximately 10 to 20% of the screened product. These granules are usually poured into trays and freeze-dried at operating pressures between 0.3 and 0.4 mbar (Capacitron values, corresponding to Thermotron values of approximately 0.4 to 0.6 mbar). The freeze-dried end-product normally has a density of approximately 230 to 260 g/l.

However, the conventional processes for producing freeze-dried coffee extract have major disadvantages.

As explained above, 30 to 35% of the granules occur as fines which must be eliminated by screening, recycled and reprocessed.

The process is cost-intensive, since the energy expended on grinding at low temperatures between approximately −40 and −50° C. and the costs of the screening and grinding stages contribute substantially to the total production costs.

In view of the still present fines and the different granule size, the product is dried at low pressures (approximately 0.3 to 0.4 mbar). However, the low drying pressures result in relatively long drying times and relatively low ice temperatures, with operating pressures of 0.3 to 0.4 mbar corresponding to product temperatures at the sublimation front of −27.0 to −25.5° C. (these ice temperatures can be determined very precisely without thermoelements using barometric temperature measurement (BTM), see e.g. H. M. Willemer, PDA Symposium, Tokyo, Nov. 14–16, 1994, page 296). The production of freeze-dried coffee granules according to the state of the art is also extremely cost- and energy-intensive in this process stage.

It was therefore the object of the invention to find a process for producing freeze-dried coffee extract with the help of which the above-cited disadvantages can be avoided but which delivers a product which satisfies the highest quality requirements.

The object was achieved by the process according to the invention in which a) coffee extract with a dry substance content of 35 to 45 wt/vol. % is foamed to a foam weight of 450 to 750 g/l, preferably 500 to 700 g/l, b) the foamed coffee extract is dropped onto a cooled belt for the formation of pellets and the pellets are frozen on the belt to temperatures below −30° C., and c) the frozen pellets are dried at pressures which are 2 to 4 times greater than those pressures which are customarily used for freeze-drying ground coffee granules.

In the process according to the invention, the foam temperature at the end of the foaming process is preferably −2 to −4° C.

The foaming process can take place according to standard procedures; the gas used is preferably nitrogen or carbon dioxide.

Major advantages of the process according to the invention manifest themselves in stage b). There, the pellets dropped onto the cooled belt can be frozen to temperatures between −30 and −40° C. within 2 to 3 minutes. In comparison with conventional processes, an approximately 10-fold saving in time is consequently achieved in this stage. Since the product does not have to be comminuted (ground), and therefore no frictional heat is generated, it is sufficient to freeze the pellets at −30 to −40° C. Energy is therefore also saved in this stage.

In stage b), the product is preferably dropped onto the cooled belt in quantities such that, after freezing, pellets with a diameter of 4 to 7 mm, preferably approximately 6 mm, and with a height of 2.5 to 3.5 mm, preferably 3 mm are obtained. The pellets can optionally be screened in the frozen state in order to eliminate "incorrect sizes".

The subsequent freeze drying of the frozen pellets takes place at pressures which are 2 to 4 times greater than those pressures which are customarily used for freeze-drying ground coffee granules. As explained above, these pressures usually lie between 0.3 and 0.4 mbar (expressed as Capacitron values). In contrast, according to the invention pressures between 0.8 and 1.5 mbar, preferably 0.9 to 1.3 mbar, are used. Converting these operating pressures to the ice temperature in the pellet (see above), results in ice temperatures between −19 and −16° C. Therefore energy can also be saved in this stage. Furthermore, the higher operating pressure improves the heat supply from the hot plate to the product by 1.6 times (cf Ehlers, H., "Bestimmung der optimalen Trocknungsbedingungen für die Gefriertrocknung von Gütern durch Messung der Wärme- und Strömungsleitwerte", 5th freeze-drying conference, Leibold AG, Cologne 1962).

In addition, at pressures between 0.8 and 1.5 mbar, the volume of steam to be transported decreases to approximately ¼, which, given the same rate of flow, means four times as much steam per unit of time and surface area. The process according to the invention therefore also results in a measurable increase in drying performance by simultaneously lower energy requirement.

The pressures between 0.8 and 1.5 mbar can be used during the total drying time or during a phase of 10–50% of the drying time, therefore for approximately 0.5 to 2.0 hours.

According to a particularly preferred embodiment, the high pressures of 0.5 to 1.5 mbar are used only during the first 0.5 to 1.5 hours after drying has begun. This period of time is sufficient to dry the topmost layer of the pellets and to give them a relatively stable, brownish shell. During the remaining drying time, lower pressures, preferably in the range from 0.3 to 0.4 mbar, can be used. This embodiment results in the further advantage that the bulk density is less markedly increased when use of the high pressure is curtailed than when the increased pressures are used during the total drying time.

According to another preferred embodiment of the invention, the drying in stage c) is carried out until the pellets have reached a density of 150 to 300 g/l.

It has surprisingly been shown according to the invention that the reversal of the principle, recognized in freeze-drying of coffee extract, of combining slow freezing times with low drying pressures produces extraordinarily successful results if the coffee extract is frozen in pellet form. Coffee extract in pellet form can be frozen in a tenth of the usual time, namely in 2 to 3 minutes, and dried at 2- to 4-times higher pressures than is possible with granules, and surprisingly a product with an attractive appearance is obtained.

The product gains in storage stability as atmospheric oxygen has reduced possibilities of attack. Moreover, the surface acquires an appearance reminiscent of fresh roasted coffee beans. If the freeze drying is carried out completely at pressures below ca 0.8 mbar, this colour effect inter alia is completely or partly lost, i.e. the pellets acquire a light or mottled appearance.

The coffee pellets produced by processes according to the invention preferably have dimensions which measure between 4 and 7 mm, preferably 6 mm, in diameter and between 2.5 and 3.5 mm, preferably 3 mm, in height. If a freeze-dried coffee product with pellets of essentially equal size is to be produced, frozen pellets with sizes which clearly deviate from the target size due to operating fluctuations can immediately be removed by screening.

The advantages of the process according to the invention are compared below with the conventional production of freeze-dried coffee extract in granular form by means of a comparison, wherein in each case three different types of coffee were used, which differed from each other with respect to their quality. Coffee type A had the lowest, and coffee type C the highest, aroma quality.

TABLE 1

Coffee type A

| Parameter | Granules | Pellets |
|---|---|---|
| Extract - solids content | 41.0 wt/vol. % ±1 wt/vol. % | 41.0 wt/vol. % ±1 wt/vol. % |
| Extract temperature | +15° C. | +15° C. |
| Foam density | ca 780 g/l | ca 550 g/l |
| Foam temperature | −4.8 to −5.1° C. | ca −3° C. |
| Freezing time | 25–30 min. | ca 2 min. |
| Freezing temperature | to −45° C. | to −30 to −40° C. |
| Grinding temperature | −40 to −50° C. | not applicable |
| Fines | 25 to 30% | not measurable |
| Screening analysis | 2–3 mm 30–55% 1–2 mm 25–30% 0.5–1 mm 10–20% <0.5 mm 0–5% | 3 × 6 mm |
| Drying pressure | 0.4 mbar | 1.3 mbar |
| Drying time | 6.4 h | ca 4 h |

TABLE 2

Coffee type B

| Parameter | Granules | Pellets |
|---|---|---|
| Extract - solids content | 42.0 wt/vol. % ±1 wt/vol. % | 42.0 wt/vol. % ±1 wt/vol. % |
| Extract temperature | +10° C. | +10° C. |
| Foam density | ca 800 g/l | ca 500 g/l |
| Foam temperature | ca −6° C. | ca −3.5° C. |
| Freezing time | 25 to 30 min. | ca 2 min. |
| Freezing temperature | to −45° C. | to −30 to −40° C. |
| Grinding temperature | −40 to 50° C. | not applicable |
| Fines | 25 to 30% | not measurable |
| Screening analysis | 2.5–3 mm 0–1% 1.6–2.5 mm 30–40% 0.5–1.0 mm 10–25% | 3 × 6 mm |
| Drying pressure | 0.33 mbar | 0.9 mbar |
| Drying time | ca 6.5 h | ca 4.5 h |

TABLE 3

Coffee type C

| Parameter | Granules | Pellets |
|---|---|---|
| Extract - solids content | 42 wt/vol. % ±1 wt/vol. % | 42 wt/vol. % ±1 wt/vol. % |
| Extract temperature | +10° C. | +10° C. |
| Foam density | ca 840 g/l | ca 650 g/l |
| Foam temperature | ca −5.5° C. | ca −3.5° C. |
| Freezing time | 25 to 30 min. | ca 2 min. |
| Freezing temperature | to −45° C. | to −30 to −40° C. |
| Grinding temperature | −40 to −50° C. | not applicable |
| Fines | 25 to 30% | not measurable |
| Screening analysis | 0.5–3.5 mm 100% 0.5–1.5 mm 0.1–1.5% 0–1.5 mm 0.1–1.5% | 3 × 6 mm |
| Drying pressure | 0.36 mbar | 1.1 mbar |
| Drying time | ca 6.5 h | ca 4 h |

The tables show that a substantial saving in time and energy with a simultaneously improved appearance of the product is possible with the process according to the invention.

What is claimed is:

1. Process for freeze-drying coffee extract, characterized in that
   a) coffee extract with a dry substance content of 35 to 45 wt/vol. % is foamed to a foam weight of 450 to 750 g/l,
   b) the foamed coffee extract is dropped onto a cooled belt to form pellets and the pellets are frozen on the belt to temperatures below −30° C., and
   c) the frozen pellets are dried at 0.8 to 1.5 mbar.

2. Process according to claim 1, characterized in that the foamed coffee of stage b) is −2 to −4° C.

3. Process according to claim 1, characterized in that in stage b) the foamed coffee extract is dropped onto the cooled belt in each case in a quantity such that pellets with a diameter of 4 to 7 mm and with a height of approximately 2.5 to 3.5 mm form.

4. Process according to claim 1, characterized in that the pellets in stage b) are frozen for 2 to 3 minutes to temperatures between −30 and −40° C.

5. Process according to claim 1, characterized in that the pellets in stage c) are freeze-dried to a density of 150 to 300 g/l.

6. Process according to claim 1, characterized in that the freeze drying in stage c) is carried out at pressures in the range from 0.8 to 1.5 mbar during stage c).

7. Process according to claim 1, characterized in that the frozen pellets are dried in stage c) at pressures in the range from 0.8 to 1.5 mbar only during a phase of 10–50% of the total time said frozen pellets are dried in stage c) and lower pressures are used during other phases of the total time said frozen pellets are dried in stage c).

8. Process according to claim 1, characterized in that the frozen pellets are dried in stage c) at pressures in the range from 0.8 to 1.5 mbar for 0.5 to 2 hours and lower pressures are used during other times said frozen pellets are dried in stage c).

* * * * *